Oct. 31, 1933. E. B. PECK 1,933,508
CATALYTIC PROCESS FOR DESTRUCTIVE HYDROGENATION OF HEAVY
HYDROCARBONS AND FOR REGENERATION OF CATALYST THEREFOR
Filed Nov. 12, 1929
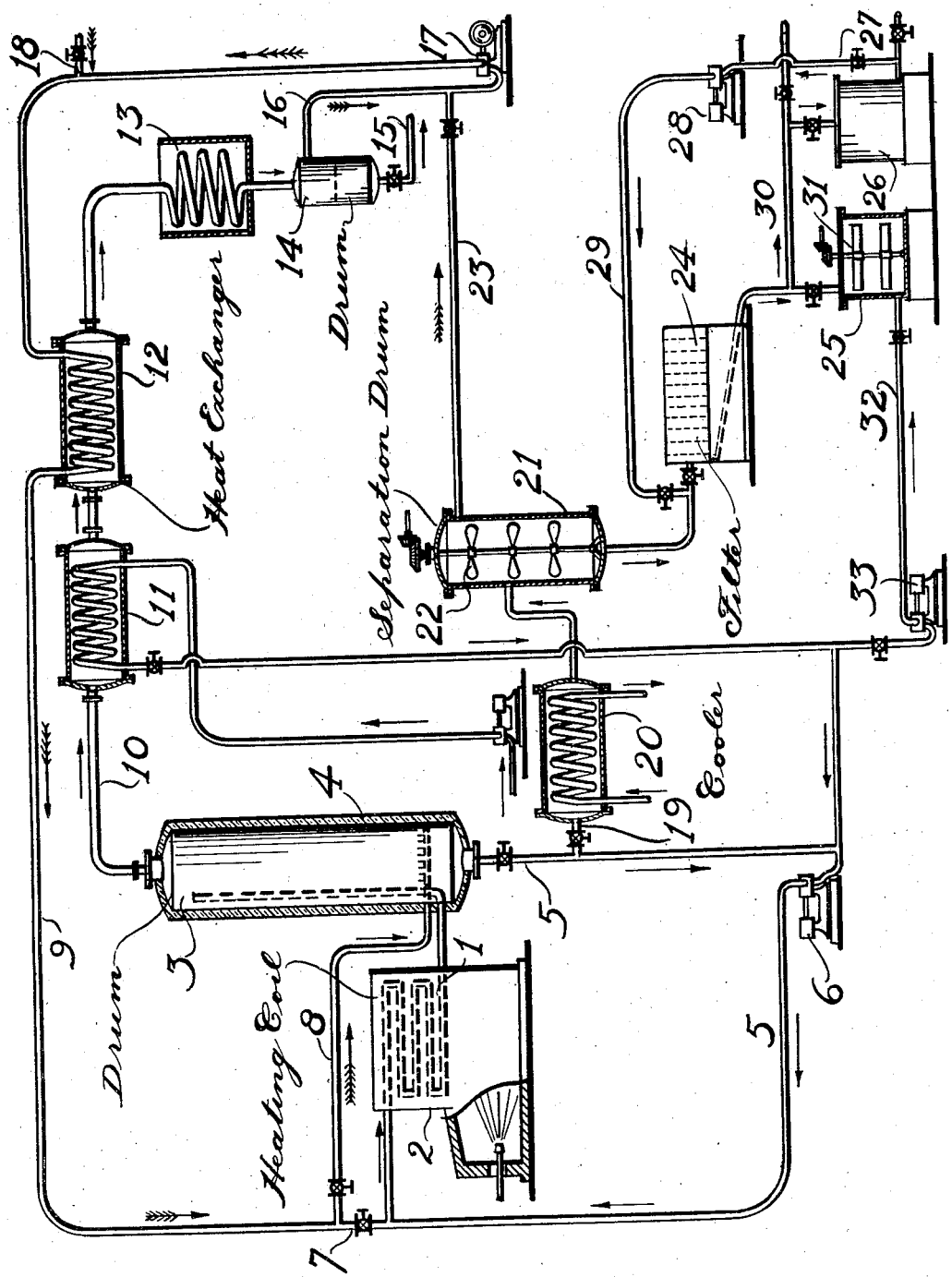
INVENTOR
Edward B. Peck
BY
ATTORNEY Patented Oct. 31, 1933

1,933,508

UNITED STATES PATENT OFFICE 1,933,508

CATALYTIC PROCESS FOR DESTRUCTIVE HYDROGENATION OF HEAVY HYDROCARBONS AND FOR REGENERATION OF CATALYST THEREFOR

Edward B. Peck, Elizabeth, N. J., assignor, by mesne assignments, to Standard-I. G. Company, Linden, N. J., a corporation of Delaware Application November 12, 1929
Serial No. 406,634

3 Claims. (Cl. 196—53)

The present invention relates to improvements in the process of producing valuable products from petroleum, shale, coal oils and fractions of such crude materials by the action of high pressure hydrogen in the presence of suitable catalytic materials. My process will be fully understood from the following description and the drawing in which I have shown an apparatus suitable for the practice of my invention.

The drawing is a semi-diagrammatic view in sectional elevation of an apparatus constructed according to my invention and indicates the flow of materials.

In the catalytic hydrogen treatment of petroleum and other hydrocarbon oils at high temperatures and pressure in great excess of atmospheric pressure, it has been observed that there is a gradual loss of catalyst activity especially when the temperature is in the neighborhood of 850° F. or higher, although with some catalyst under some conditions this is observed at lower temperatures. I have observed that this loss of activity is in part, at least, due to adsorption of certain, high molecular weight, tarry materials which appear to coat the surface of the catalysts. This action is not to be confused with poisoning by sulphur and the like since the catalysts used in the hydrogen treatment of petroleum are to a high degree resistant to sulphur and the other ordinary catalyst poisons. I have found that the catalyst may be revivified by washing with a suitable solvent and by my method, runs may be continued for long periods without serious loss of catalyst activity.

Referring to the drawing reference numeral 1 indicates a heating coil arranged in a furnace setting 2 and adapted to heat a stream of oil and gas to a high temperature. The coil discharges into a drum 3 which is constructed to withstand pressures of 200 atmospheres or higher and temperatures in excess of 900° F. as well as the corrosive effects of the reactants. The drum is protected from excessive loss of heat by an insulating layer 4 and may be heated in any suitable manner, for example, internally by electricity or otherwise. The preferred method, however, is to remove a part of the oil by line 5 and recirculate it by means of pump 6 through coil 1 and back to drum 3.

Gas rich in free hydrogen is forced into the inlet of coil 1 and/or drum 3 by means of branches 7 and 8 respectively from hydrogen supply line 9. Vapor may be removed from drum 3 by vapor pipe 10 which communicates with heat exchangers 11 and 12 and thence to condenser 13 and separation drum 14. The distillate oil is removed to storage (not shown) by line 15 and gas is taken by line 16 to booster pump 17 by which it is returned to hydrogen supply line 9 by way of exchanger 12 for preheating. The oil may be purified in any suitable apparatus (not shown) for partial removal of hydrogen sulphide and gaseous hydrocarbons. Fresh hydrogen is added by line 18 under suitable pressure.

Catalyst is suspended in a finely ground form in the oil in drum 3 and no difficulty is found in circulating it with the oil through line 5 and pump 6.

Line 19 is provided for withdrawal of a part of the contents of drum 3 and communicates with a cooler 20 and a gas separation drum 21 which is fitted with a stirring means 22 to keep the catalyst in suspension. Gas is removed by line 23 and may be returned to the booster pump 17, if desired. A plurality of release drums may be held at successively lower pressures, if desired.

The oily suspension of catalyst is then forced through a filter 24 and the oil free of solid is collected in a tank 25. The catalyst is then washed by pumping a suitable solvent through the filter from tank 26 through line 27, pump 28 and line 29 and finally back to tank 26 by pipe 30.

The purified or reactivated catalyst may be added to tank 25 which is fitted with a stirrer 31 and the mixture returned to the system by line 32 and pump 33.

In the operation of my process the drum or reactor 3 is maintained at pressure in excess of about 20 or 50 atmospheres but preferably over 100 or even 200 atmospheres and at a temperature over about 750° F. The catalytic material which comprises an oxide or oxides or sulphides of metals of the second and sixth groups of the periodic system of elements either alone or in admixtures with other materials such as zinc oxide, alumina, magnesia or the rare earths, is suspended in the oil in a finely ground state. All of these catalytic materials are sulphactive, that is, are not poisoned by or in the presence of sulfur or sulfur containing compounds.

A stream of catalyst containing oil is either continuously or intermittently withdrawn from the drum and the catalyst is removed therefrom in any satisfactory manner—for example, by filtration, centrifugal means or settling. It is preferable to cool the oil and release the gas therefrom to avoid danger from fires and the like.

The catalyst is then thoroughly washed with a suitable solvent such as a light hydrocarbon naphtha or kerosene, benzol, toluol, xylol and the like or hydrogenated aromatics such as tetra or hexa-hydronaphthalene, or cracked gas oil or cracked tar. Acetone, carbon disulphide or carbon tetra chloride may also be used. The washed catalyst is then returned to the drum either in the withdrawn oil or in the fresh oil feed and it is found that the activity of the catalyst can be maintained for long periods at any predetermined degree depending on the temperature condition of the drum, the oil fed and the quantity of suspension withdrawn for catalyst revivification.

While the apparatus shown is that preferred in the operation of my process, I do not wish to be limited to that particular method. Nor do I wish to be limited to the mechanism of the revivification process or any theory of its action, which may have been disclosed, but only by the following claims in which I wish to claim all novelty inherent in the invention.

I claim:

1. In a process for the destructive hydrogenation of heavy hydrocarbon material containing tarry bituminous substances in the presence of sulfactive catalytic materials comprising oxides and sulfides of metals of the II and VI groups of the periodic system, the method of maintaining the hydrogenating activity of the catalytic material which comprises withdrawing a portion of the partially spent catalytic material from the reacting mass and treating the catalytic material so withdrawn with a solvent for tarry materials of high molecular weight.

2. Process according to claim 1 in which the partially spent catalytic material withdrawn from the reacting mass is treated with a liquid hydrocarbon.

3. Process according to claim 1 in which the partially spent catalytic material withdrawn from the reacting mass is treated with a naphtha of low boiling point range.

EDWARD B. PECK.